STACKED DIODE HIGH-VOLTAGE RECTIFIER AND METHOD OF MANUFACTURE THEREOF

Filed Aug. 25, 1967 2 Sheets-Sheet 1

*INVENTOR.*
LUDOVIUS A.L.ESSELING

BY

AGENT

Dec. 1, 1970 L. A. L. ESSELING 3,543,395

STACKED DIODE HIGH-VOLTAGE RECTIFIER AND METHOD OF MANUFACTURE THEREOF

Filed Aug. 25, 1967 2 Sheets-Sheet 2

INVENTOR.
LUDOVICUS A.L.ESSELING

BY

AGENT

United States Patent Office 3,543,395

Patented Dec. 1, 1970

3,543,395

STACKED DIODE HIGH-VOLTAGE RECTIFIER AND METHOD OF MANUFACTURE THEREOF

Ludovicus Augustinus Lambertus Esseling, Nijmegen, Netherlands, assignor, by mesne assignments, to U.S. Philips Corporation, New York, N.Y., a corporation of Delaware Filed Aug. 25, 1967, Ser. No. 663,407

Claims priority, application Netherlands, Aug. 26, 1966, 6612022

Int. Cl. H01l *1/10*

U.S. Cl. 29—588 14 Claims

ABSTRACT OF THE DISCLOSURE

A high-voltage rectifier comprises a stacked series array of semiconductor wafers having etch-resistant electrode coatings, mounted in clamped relation, between etch-resistant current-supply members, in an insulated housing, prior to etching. After the etching process, the space between the stacked array and the walls of the housing is filled with a resilient insulating material, and then encapsulated in an insulating resin.

The invention relates to a method of manufacturing a high-voltage rectifier formed by a stack of diode elements, elastically clamped in an insulating holder between current supply members, said elements having been subjected to an etching treatment. The term diode element is to denote herein a semiconductor wafer, the thickness of which is smaller than the length and the width in the case of a rectangular wafer and smaller than the diameter in the case of a round wafer, the two major faces forming contacts and the wafer having at least two zones of different conductivity type, the ends of which zones are connected to said contacts.

It is common practice to manufacture such high-voltage rectifiers by first subjecting the diode elements to an etching treatment, usually after having been sawed or cut from much larger wafers, after which they are controlled by means of an electrical measurement in order to remove defective elements, the elements being finally stacked and clamped elastically between the current supply members.

It has been found that in spite of the electrical control the break-down voltage of the high-voltage rectifier is often lower than might be expected. The invention is based on the recognition of the fact that this is in many cases due to the fact that the etched diode elements are highly vulnerable during the various manipulations in stacking, so that short-circuiting might be produced therein.

According to the invention the diode elements are subjected in common to the etching treatment subsequent to starting and elastically clamping in the insulating holder. Since there is then no need for subjecting them to a mechanical treatment, the risk of damage is considerably reduced. As a matter of course, the holder and the current supply members are made of materials resistant to etching to a reasonable extent. For the holder this problem can be solved easily, since most thermo-plastic or heat-curing synthetic resins and most ceramic materials satisfy this requirement. For the current supply members this problem can be solved by providing them with a chemically resistant coating, for example, of gold.

The stack of diode elements and the insulating holder are preferably constructed so that a clearance is left between the sides of the stack and the inner side of the holder. Thus the etchant has free access to the elements. The stack is enveloped, subsequent to etching, preferably in a soft, for example, elastic or viscous insulating material, for example, silicone rubber. Finally the rectifier can be housed in a rigid envelope.

The invention will now be described with reference to one embodiment which is shown in the figures. The figures are drawn quite diagrammatically on an enlarged scale.

Figure 1:
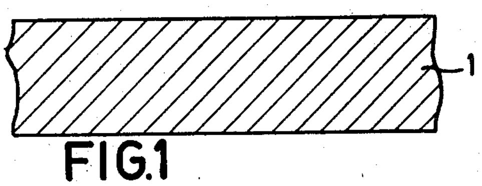
FIGS. 1 to 3 illustrate various stages of the manufacture of diode elements in a cross sectional view.
Figure 2:
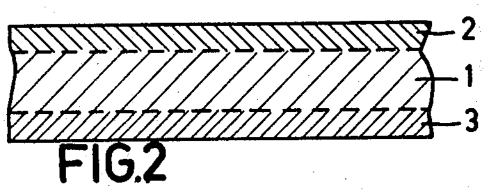
Figure 3:
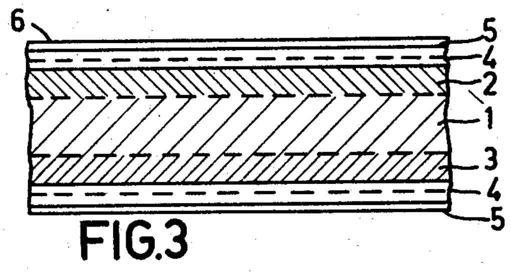

The basic material may be a silicon wafer 1 of p-type conductivity, part of which is shown in FIG. 1; the resistivity is 50 ohm cm. and the thickness is 300$\mu$. From one face phosphorus is diffused to form a silicon layer 2 of n-type conductivity of a thickness of 50$\mu$, whereas from the opposite face boron is diffused to form a $p^+$-type silicon layer 3 having also a thickness of 50$\mu$ (FIG. 2). Then, in a conventional manner a nickel layer 4 is deposited on the two faces, for example by electrolysis. These nickel layers, indicated in FIG. 3 by broken lines, are sintered by heating at 650° C. for 5 minutes and then intensified galvanically by a gold layer 5. A rhodium layer 6 may then be applied to one of these gold layers in order to be able to distinguish the electrodes of the diode elements in their further treatment of the diode elements.

Figure 4:
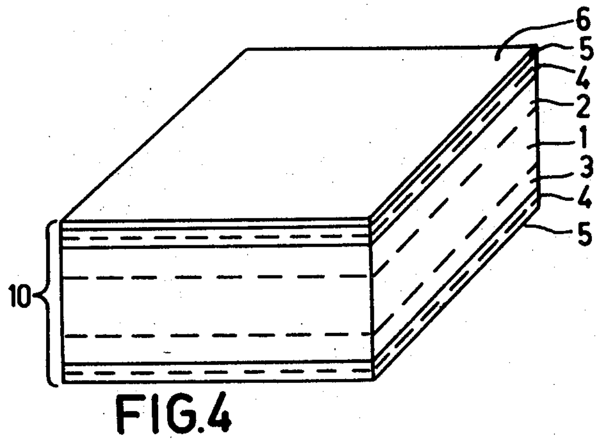
FIG. 4 shows perspectively a finished diode element.

The diode elements 10 are finally obtained by sawing or cutting the wafers. For the aplication of the invention it is not essential whether the elements are round or rectangular. With a view to loss of material rectangular or square wafers are preferred (see FIG. 4). The length and width of such an element may be 1 mm.

Figure 5:
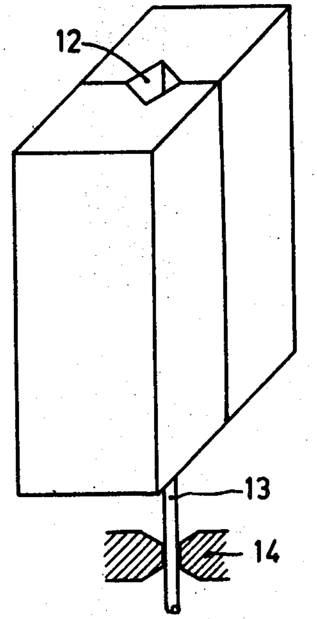
FIG. 5 shows a filling apparatus in a perspective view.

Then a number of these diode elements is stacked up in a filling apparatus, consisting of two detachable halves. As will be apparent from FIG. 5, this apparatus has a space 12 into which, from below, a current supply member 13 is inserted nearly up to the upper side of the space 12. The lower end of this member is clamped tight at 14. When a diode element is put from above into the space 12, the member is lowered over a distance equal to the thickness of the element, in this case about 300$\mu$. As soon as the required number of elements is stacked up, the other current supply member is pressed on the stack and the filling apparatus can then be opened.

Figure 6:
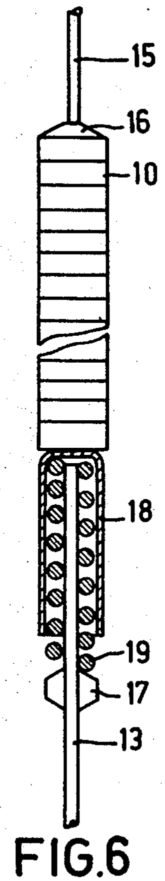
FIG. 6 shows a stack of diode elements with current supply members, partly in elevation and partly in a sectional view.
Figure 7:
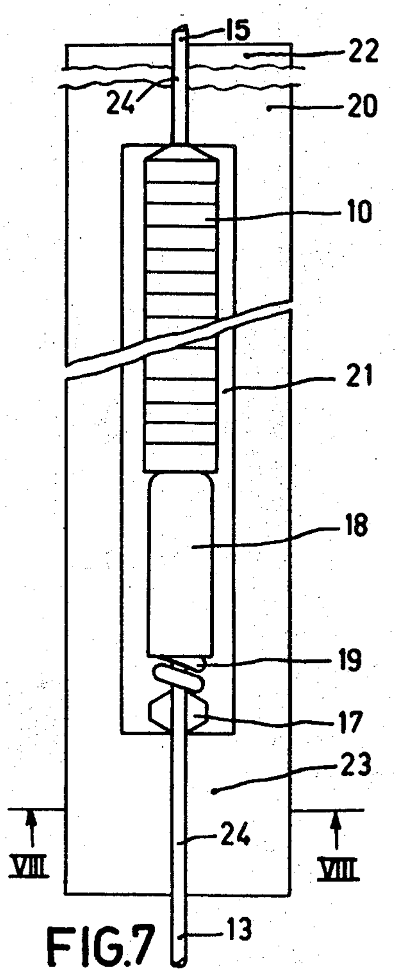
FIG. 7 is a side elevation of an insulating holder in which the stack is secured.
Figure 8:
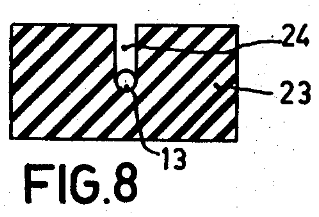
FIG. 8 is a sectional view of this holder taken on the line VIII—VIII in FIG. 7.

As will be seen from FIG. 6, the assembly is then formed by an upper current supply member 15 having a head 16, a number of diode elements 10 and a lower current supply member 13, consisting of a wire with a thickened part 17, a cap 18 and a helical spring 19, which bears on the thickened part and urges the cap against the stack. This assembly is transferred to an insulating holder 20 (see FIG. 7), which has a window 21, the inner width of which may be 5 mms., so that on either side of the stack a certain amount of clearance is left. The upper transverse part 22 and the lower transverse part 23 of the holder have slots 24, in which the current supply members 15 and 13 respectively are clamped tight (see FIG. 8).

Figure 9:
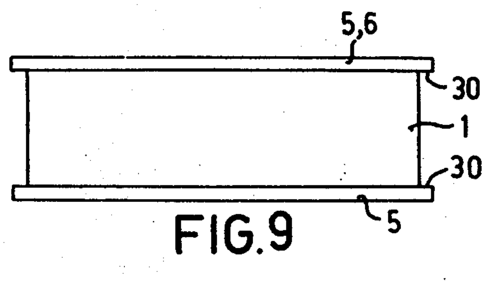
FIG. 9 is a side elevation of a diode element subsequent to etching.

For cleaning the diode elements, particularly where the junctions between zones of opposite conductivity types emerge to the surface, the whole holder with the stack of elements clamped tight therein is dipped for 30 seconds into an etching solution containing, for example, 100 parts of concentrated nitric acid and 20 parts of concentrated hydrofluoric acid. Then the assembly is rinsed in water, etched again in a 2.5% solution of caustic soda, again rinsed and then dried. Since the gold layer and any rhodium layers of the elements are not attacked by the etchants, these layers slightly project from the sides of the elements (see FIG. 9). The width of the projecting edges 30 may be 15$\mu$. It appears that in particular the metal of these edges contaminates the sides of the elements and detracts from the resistance to break-down, if the elements are etched prior to stacking. By etching the elements subsequent to stacking, the risk is avoided.

Figure 10:
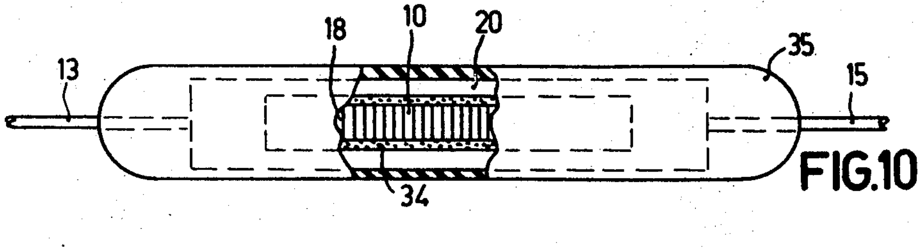
FIG. 10 is partly an elevation and partly a sectional view of a finished high-voltage rectifier.

After drying the space in the frame 21 around the stack is filled with an elastic insulating material 34, for example, silicon rubber, which is indicated in broken lines in FIG. 10; the assembly is then encapsulated in an insulating thermo-plastic synthetic resin 35.

The term "insulating material" has to be considered, particularly with respect to the material 34, surrounding the stack directly, to include also materials which may have a certain conductivity or a high dielectric constant. Such materials may contribute to a uniform voltage distribution over the stack.

It will be obvious that, although in the foregoing a rectifier is described in which the insulating holder contains one stack of diode elements, holders may be used within the scope of the invention, which comprise more than one stack. The stacks may be interconnected, for example, in series. This construction is particularly useful when the number of diode elements has to be so large that a single stack would become unstable. A number of stacks may also be connected in a different way, for example, four stacks in a bridge to form a so-called Graetz circuit, or two stacks in opposition to form a so-called Greinacker circuit. Within the scope of the invention it is furthermore possible to arrange current supply member not only at the end of the stack for clamping it elastically, but also to arrange current supply members between some diode elements in the stack.

A high-voltage rectifier according to the invention is particularly suitable for use in a television apparatus.

What is claimed is:

1. A method of manufacturing a high-voltage rectifier comprising a stack of diode elements, which comprises forming a stack of diode elements having electrodes, clamping the stack elestically in an insulating holder between current supply members, and thereafter subjecting the clamped stack in the holder to an etching treatment capable of removing material from said diode elements.

2. A method as claimed in claim 1, wherein the current supply members are made of a material resistant to etching.

3. A method as claimed in claim 2, wherein the current supply members are coated with gold.

4. A method as claimed in claim 1, wherein a clearance is left between the sides of the stack and the inner side of the holder.

5. A method as claimed in claim 1, wherein subsequent to etching the stack is enveloped in a soft insulatnig material.

6. A method as claimed in claim 5, wherein the stack is enveloped in silicon rubber.

7. A method as claimed in claim 5, wherein the rectifiers are finally provided with a rigid envelope.

8. The method according to claim 1, wherein a plurality of stacks are arranged interconnected in series within the insulating holder.

9. The method according to claim 1, wherein four stacks are arranged to form a Graetz circuit.

10. The method according to claim 1, wherein two stacks are arranged in opposition to form a Greinacker circuit.

11. The method according to claim 10, wherein current supply members are additionally arranged between the diode elements in the stack.

12. The method of manufacturing a high-voltage rectifier which comprises the steps of:

- treating a semiconductor element having a pair of substantially flat parallel surfaces to produce layers of opposite conductivity type on the respective opposing surfaces of said element,
- overlaying the surface of each of said layers with an etch-resistant electrode layer,
- cutting a plurality of wafers along substantially parallel planes on said element normal to the planes of said electrodes,
- forming said wafers into a stacked series array,
- applying etch-resistant current supply means in clamped relation on opposed position of said stack,
- mounting said stack array in lateral spaced relation to the inner walls of a longitudinal insulating housing having one or more elongated openings,
- exposing said stacked array in said housing to an etching process until the edges of the electrode layers project slightly beyond the edge portions of the semiconductor body of each of said wafers,
- filling the space between said stacked array and the inner walls of said housing with an elastic insulating medium, and
- encapsulating said stacked array in said housing in an insulating synthetic resin.

13. The method in accordance with claim 12, wherein overlying the surface of each of said layers with an electrode layer having an etch-resistant surface comprises the steps of:

- applying a nickel layer on the surface layers of said semiconductor element by electrolysis,
- sintering said nickel layers to the surface layers of said semiconductor element by heating at a temperature of about 650° centigrade, and
- galvanically applying a gold layer to each of said nickel layers.

14. The method in accordance with claim 12, wherein said etching process comprises exposing said stacked array for about 30 seconds to an etching solution consisting of about 5 parts of concentrated nitric acid and 1 part of concentrated hydrofluoric acid, rinsing said array in water, etching said array in a 2.5% solution of caustic soda, and again rinsing said array in water.

References Cited

UNITED STATES PATENTS

| | | | |
|---|---|---|---|
| 2,750,540 | 6/1956 | Waldkotter et al. | 29—576 |
| 2,844,771 | 1/1958 | Seider et al. | |
| 2,922,091 | 1/1960 | Parrish et al. | |
| 3,151,382 | 10/1964 | McHugh | 29—25.42 |
| 3,230,427 | 1/1966 | Krysmanski. | |
| 3,303,549 | 2/1967 | Peyser. | |
| 3,355,636 | 11/1967 | Becke et al. | 29—589 X |

JOHN F. CAMPBELL, Primary Examiner

R. B. LAZARUS, Assistant Examiner

U.S. Cl. X.R.

29—576, 589

PO-1050
(5/69)

UNITED STATES PATENT OFFICE
CERTIFICATE OF CORRECTION

Patent No. 3,543,395 Dated December 1, 1970

Inventor(s) L.A.L. ESSELING

It is certified that error appears in the above-identified patent and that said Letters Patent are hereby corrected as shown below:

Col. 2, line 63, "5 mms." should read -- 4 mms. --.

Col. 3, line 48, "elestically" should read -- elastically --

Signed and sealed this 23rd day of March 1971.

(SEAL)
Attest:

EDWARD M.FLETCHER,JR.
Attesting Officer

WILLIAM E. SCHUYLER, JR
Commissioner of Patents